(12) United States Patent
Bennett et al.

(10) Patent No.: US 6,557,252 B2
(45) Date of Patent: May 6, 2003

(54) CABLE SPLICING METHOD AND APPARATUS

(75) Inventors: Richard A. Bennett, Smithtown, NY (US); Robert L. Benoit, Oakdale, NY (US); Bernard I. Rachowitz, Lloyd Neck, NY (US); Glenn L. Spacht, Lloyd Neck, NY (US)

(73) Assignee: Fuel Cell Components and Integrators, Inc., Hauppauge, NY (US)

( * ) Notice: Subject to any disclaimer, the term of this patent is extended or adjusted under 35 U.S.C. 154(b) by 33 days.

(21) Appl. No.: 09/735,869

(22) Filed: Dec. 14, 2000

(65) Prior Publication Data

US 2002/0074150 A1 Jun. 20, 2002

(51) Int. Cl.[7] ................................................. H01R 43/00
(52) U.S. Cl. .......................... 29/868; 29/602.1; 29/850; 29/748; 29/446; 29/447
(58) Field of Search ....................... 29/868, 869, 602.1, 29/850, 748, 755, 446, 447

(56) References Cited

U.S. PATENT DOCUMENTS 4,518,445 A * 5/1985 Pedersen et al. .............. 29/868
5,492,016 A * 2/1996 Pinto et al. ............... 361/283.4

* cited by examiner

Primary Examiner—Timothy V. Eley
Assistant Examiner—Alvin J Grant
(74) Attorney, Agent, or Firm—Salzman & Levy

(57) ABSTRACT

A method and apparatus for fabricating uniform splices for stranded cables. A joint for a stranded cable can be formed by inserting the ends of two cables into an electrically conductive splice band which, in turn, is inserted into a coil or inductor. The splice is fabricated by a process known as magnetic pulse forming, or magnetic pulse welding wherein a very large electrical current of short duration is directed through the coil or inductor from a charged capacitor bank. The resulting magnetic field in the coil or inductor induces a magnetic field on the splice band, compressing the splice band uniformly around the circumference of the two cable ends being spliced. In the case of magnetic pulse welding, the splice not only uniformly compresses the stranded cables, but a weld is also created between the inner diameter of the sleeve and the adjacent stranded cables.

11 Claims, 4 Drawing Sheets

Section A-A

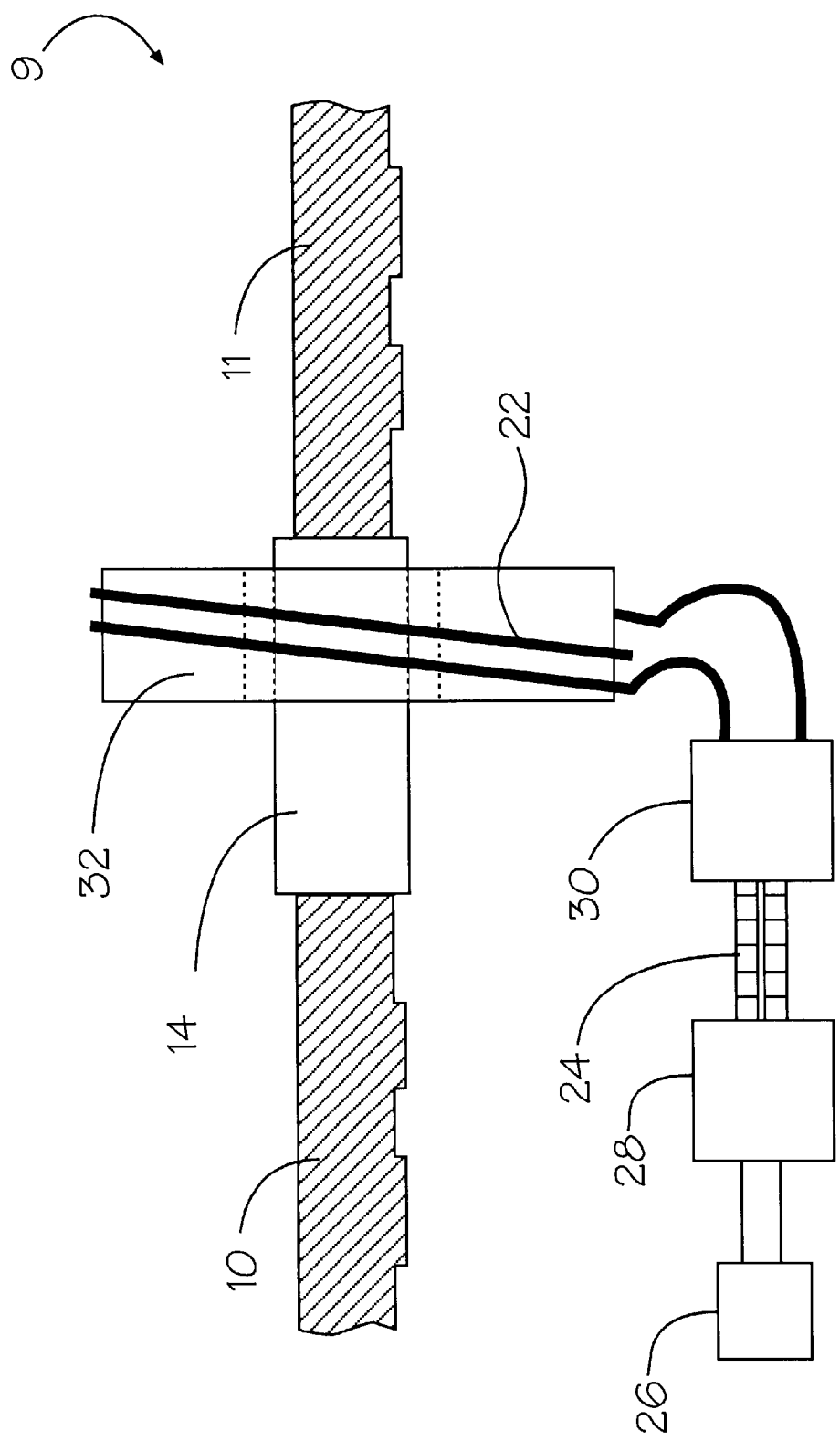

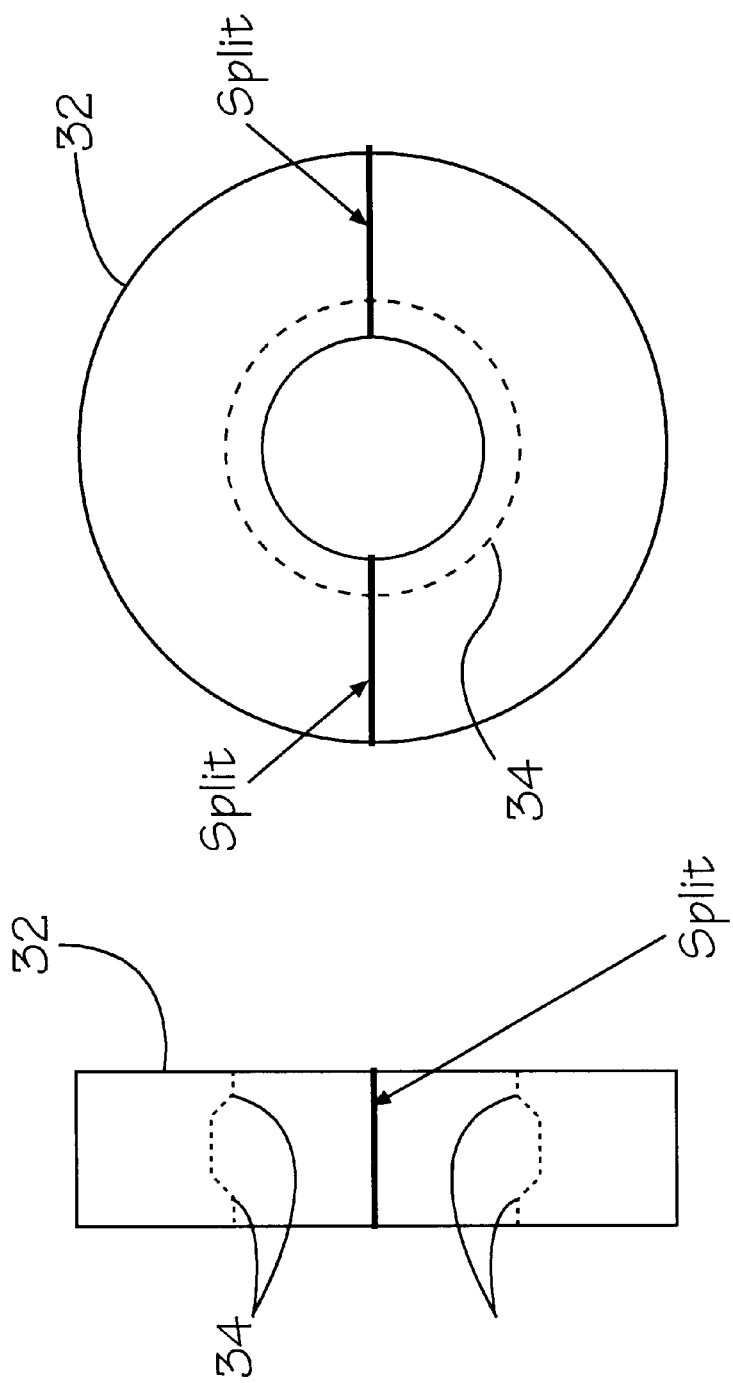

CABLE SPLICING METHOD AND APPARATUS

FIELD OF THE INVENTION

The present invention relates to cable splicing and, more particularly, to an apparatus and method for splicing cables using magnetic pulse forming or magnetic pulse welding techniques.

BACKGROUND OF THE INVENTION

Stranded cables are manufactured by twisting multiple wire strands around one another. A length of the stranded cable is then wrapped around a spool, and shipped to the end user. The end user, at times, must splice together two or more lengths of cable in order to fabricate a cable of sufficient length as may be required for a specific application one technique for splicing pieces of cable together involves inserting respective ends of two cables into a splice band and mechanically crimping the splice band from three equally spaced directions, one hundred and twenty degrees apart.

One of the problems associated with this splicing process is the inconsistency in engaging the fibers in the splice band. Very often the band does not contact all of the fibers disposed about the entire three hundred and sixty degrees of the banded joint. Generally, it is observed that there is better engagement of the fibers at the center of the crimped areas of the band, which are located sixty degrees apart. As a result, the strength of the joint is usually not uniform.

SUMMARY OF THE INVENTION

In accordance with the present invention, there is provided a method and apparatus for uniformly splicing stranded cables. A joint for a stranded cable can be formed by inserting the ends of two cables into an electrically conductive splice band which, in turn, is inserted into a coil or inductor. The splice is fabricated by a process known as magnetic pulse forming, or magnetic pulse welding, wherein a very large electrical current pulse of short duration is directed through the coil or inductor from a charged capacitor bank. The resulting magnetic field in the coil or inductor creates an induced magnetic field on the splice band, compressing the splice band uniformly around the circumference of the two cable ends being spliced. In the case of magnetic pulse welding, the splice band not only uniformly compresses the stranded cables but a weld is also created between the inner diameter of the sleeve and the adjacent stranded cables. A field shaper can be interposed between the electrical coil or inductor, and the splice band in order to focus the imposed magnetic forces in a specific region or regions of the splice band. A variation of this approach is to provide a split in the coil/field shaper combination or the inductor so as to form semicircular segments to allow removal from a completed spliced wire. This would be required typically in the case of a wire spliced between two existing wires. Concentrators may be incorporated into the field shaper to increase the magnetic flux in localized areas of the splice band.

It is an object of this invention to provide an improved splice method and apparatus.

It is another object of the invention to provide a uniform splice by means of magnetic pulse forming or magnetic pulse welding.

BRIEF DESCRIPTION OF THE DRAWINGS

A complete understanding of the present invention may be obtained by reference to the accompanying drawings, when considered in conjunction with the subsequent detailed description, in which:

FIG. 2 is a schematic, plan view of a splice being magnetically pulse formed or magnetically pulse welded in an apparatus of this invention;

FIG. 4a is a front view of a field shaper as in FIG. 3a except that there is a split in the ring to allow the field shaper to open after the wire splice operation is completed.

FIG. 4b is a side view of the optional split field shaper in the open position.

For purposes of clarity and brevity, like elements and components shall bear the same numbering and designations throughout the figures.

DESCRIPTION OF THE PREFERRED EMBODIMENT

Generally speaking, this invention features a method and apparatus for fabricating uniform splices for stranded cables. A joint for a stranded cable can be formed by inserting the ends of two cables into an electrically conductive splice band which, in turn, is inserted into a coil or inductor. The splice is fabricated by a process known as magnetic pulse forming, or magnetic pulse welding, wherein a very large electrical current of short duration is directed through the coil or inductor from a charged capacitor bank. The resulting magnetic field in the coil or inductor induces a magnetic field on the splice band, compressing the splice band uniformly around the circumference of the two cable ends being spliced. In the case of magnetic pulse welding, the splice band not only uniformly compresses the stranded cables but a weld is also created between the inner diameter of the sleeve and the adjacent stranded cables.

Figure 1A:
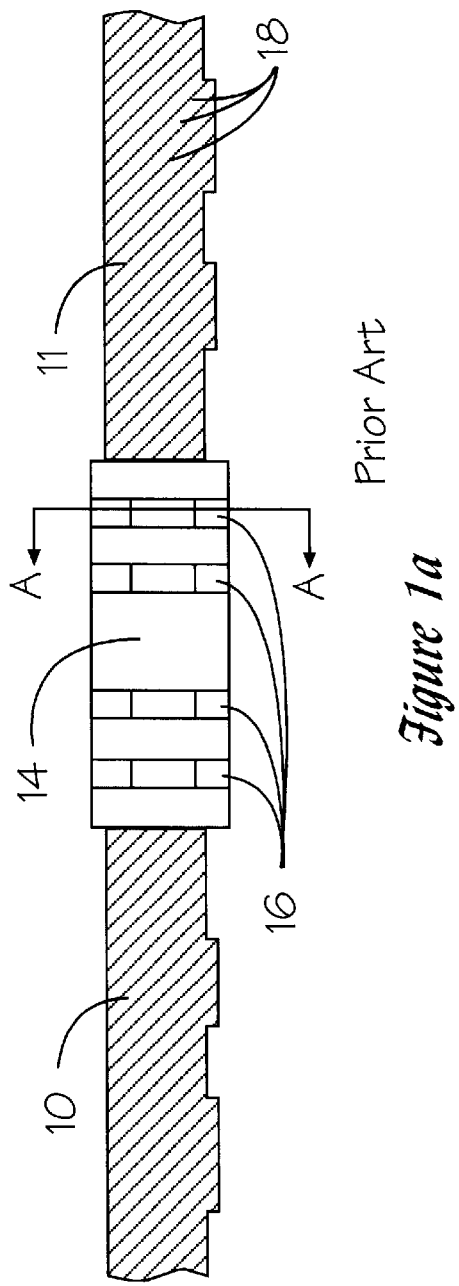
FIG. 1a is a side view of a splice for two stranded cables in accordance with a prior art crimping procedure.
Figure 1B:
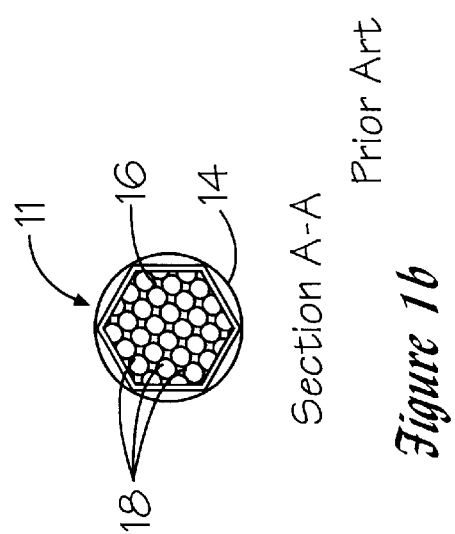
FIG. 1b is a sectional view of the splice shown in FIG. 1a, taken along lines A—A.

Now referring to FIGS. 1a and 1b, a prior art apparatus for splicing two stranded cable ends 10 and 11, respectively, is shown. A splice band 14 is wrapped about the two respective cable ends 10 and 11, and crimps are applied to a splice band 14 at the points depicted by arrows 16.

The splice band 14 is mechanically crimped about the circumference thereof, from three equally spaced directions, one hundred and twenty degrees apart.

One of the problems associated with this splicing process is the inconsistency in engaging the fibers in the splice band. Very often the band does not contact all the fibers disposed about the entire three hundred and sixty degrees of the banded joint, as can be observed in sectional view A—A (FIG. 1b). Generally, it is observed that better engagement of the strands or fibers 18 occurs at the center of the crimped areas 16 of the band 14, which are located sixty degrees apart. As a result, the strength of the joint is usually not uniform.

Referring to FIG. 2, a joint for stranded cable can be formed in accordance with this invention by inserting the respective cable ends 10 and 11 into an electrically conductive splice band 14 which, in turn, is inserted into a coil or inductor 22 of a machine 9. Applying a process known as magnetic pulse forming, or magnetic pulse welding a very large electrical current of short duration is directed through the coil or inductor 22 from a charged capacitor bank 24. The capacitor bank 24 is charged from a power source 26, which is fed through a charge controller 28. The charge from the capacitor bank 24 is then applied into the coil 22 via the discharge controller 30, with the resulting magnetic field in the coil or inductor 22 inducing a magnetic field in the splice band 14. The repelling force compresses the splice band 14 uniformly around the circumference. In the case of magnetic pulse welding, the splice band not only uniformly compresses the stranded cables, but a weld is also created between the inner diameter of the sleeve of the adjacent stranded cables.

Figure 3B:
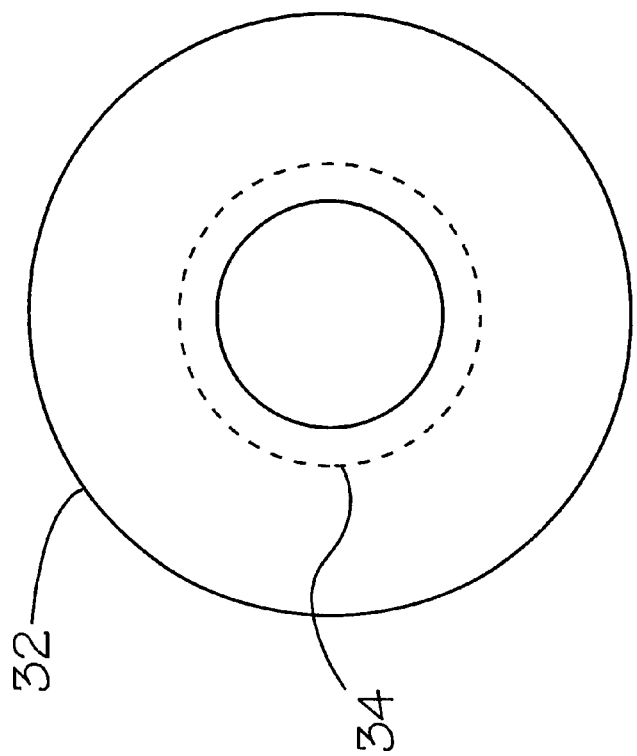
FIG. 3b is a side view of the field shaper or inductor illustrated in FIG. 3a, depicting the concentrators disposed therein.
Figure 3A:
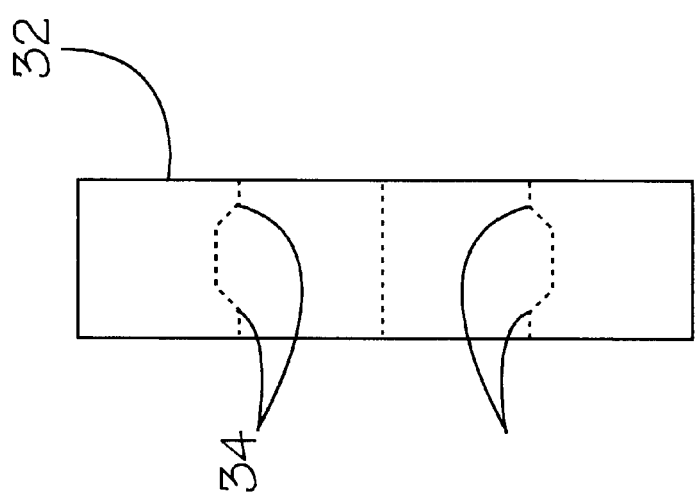
FIG. 3a is front view of the field shaper or inductor shown in FIG. 2, with concentrators disposed therein.

A field shaper 32, as shown in FIGS. 3a and 3b, may be interposed between the electrical coil or inductor 22, and the splice band 14, as illustrated in FIG. 2. The field shaper 32 helps focus the imposed magnetic forces in a specific region or regions of the splice band 14. Concentrators 34 may be incorporated into the field shaper 32 to increase the local forming of the splice band 14.

Now turning to FIG. 4a, this is a side view of a field shaper or inductor wherein a horizontal split is added to the part to allow removal after the splice is completed. This is of particular importance if a section of wire is added between two wires. FIG. 4b is a side view of the split field shaper or inductor again showing the location of the split.

In order to rapidly manufacture long cables at remote sites, the magnetic forming cable splicing or welding machine 9 can be installed on a mobile platform such as a truck.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A method of joining two cables together, comprising the steps of:
    a) inserting respective ends of two cables to be joined into an electrically conductive splice band;
    b) positioning a coil or inductor around said splice band; and
    c) passing voltage through said coil or inductor to electromagnetically form and shrink said splice band upon said two cables.

2. The method of joining two cables together in accordance with claim 1, wherein step (c) further comprises the steps of:
    d) charging a bank of capacitors from a power source by means of a charge control circuit; and
    e) discharging said bank of capacitors through said coil or inductor.

3. The method of joining two cables together in accordance with claim 1, wherein step (c) further comprises the step of:
    d) placing a field shaper between the coil or inductor and the splice band.

4. The apparatus for joining two cables together in accordance with claim 1, wherein said apparatus is a portable machine.

5. The apparatus for joining two cables together in accordance with claim 1, wherein said splicing means comprises a splicing band.

6. An apparatus for joining two cables together, comprising:
    splicing means for receiving respective ends of two cables to be joined, said splicing means being electrically conductive;
    a coil or inductor disposed around said splicing means; and
    voltage means connected to said coil for passing voltage through said coil or inductor to magnetically pulse form or magnetically pulse weld said splicing means about said two cables.

7. The apparatus for joining two cables together in accordance with claim 6, wherein said voltage means further comprises:
    a bank of capacitors connected to a power source by means of a charge control circuit; and
    discharging means connected to said bank of capacitors for discharging said bank of capacitors through said coil or inductor.

8. The apparatus for joining two cables together in accordance with claim 6, further comprising:
    a field shaper disposed between the coil and the splicing means.

9. The apparatus for joining two cables together in accordance with claim 8, wherein the field shaper further comprises concentrators.

10. The apparatus for joining two cables together in accordance with claim 6, further comprising:
    a field shaper disposed between the coil wherein both the coil and field shaper are split to allow removal after completion of the wire splice.

11. The apparatus for joining two cables together in accordance with claim 6, further comprising:
    an inductor, which is split to allow removal after completion of the wire splice.

* * * * *